(12) United States Patent
Chen

(10) Patent No.: US 11,220,210 B1
(45) Date of Patent: Jan. 11, 2022

(54) LIGHT PIPE

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/374,070

(22) Filed: Jul. 13, 2021

(51) Int. Cl.
*B60Q 3/54* (2017.01)
*B60Q 3/78* (2017.01)
*B60Q 3/62* (2017.01)
*B60Q 3/283* (2017.01)
*B60Q 3/20* (2017.01)
*B60Q 3/51* (2017.01)

(52) U.S. Cl.
CPC .............. *B60Q 3/54* (2017.02); *B60Q 3/20* (2017.02); *B60Q 3/283* (2017.02); *B60Q 3/51* (2017.02); *B60Q 3/62* (2017.02); *B60Q 3/78* (2017.02); *B60Q 2500/10* (2013.01)

(58) Field of Classification Search
CPC ... B60Q 3/54; B60Q 3/78; B60Q 3/62; B60Q 3/283; B60Q 2500/10; B60Q 3/20; B60Q 3/12; B60Q 3/51
USPC ........................................................ 362/511
See application file for complete search history.

(56) References Cited

U.S. PATENT DOCUMENTS

| 8,545,070 B2* | 10/2013 | Sakiyama | F21S 43/237 362/494 |
|---|---|---|---|
| 9,937,858 B2 | 4/2018 | Katsurayama et al. | |
| 10,035,455 B2 | 7/2018 | Yamato et al. | |
| 2010/0254152 A1* | 10/2010 | Taleb-Bendiab | G02B 6/0061 362/551 |
| 2014/0211493 A1* | 7/2014 | Ichikawa | F21S 43/237 362/511 |
| 2015/0009696 A1* | 1/2015 | Ogata | G02B 6/001 362/511 |
| 2015/0362659 A1* | 12/2015 | Nishihata | F21S 41/24 362/511 |
| 2016/0102834 A1* | 4/2016 | Yamada | F21S 43/247 362/511 |
| 2017/0234501 A1* | 8/2017 | Hanami | G02B 6/0036 362/511 |

FOREIGN PATENT DOCUMENTS

| DE | 19804440 A1 | 8/1999 |
| DE | 10259623 A1 | 7/2004 |
| DE | 102005011715 B4 | 9/2008 |
| EP | 0933587 A2 | 1/1999 |

* cited by examiner

*Primary Examiner* — Laura K Tso
(74) *Attorney, Agent, or Firm* — David Coppiellie; Price Heneveld LLP

(57) ABSTRACT

A light pipe is provided that includes a light transmissive medium having an input at one end and configured to be operatively coupled to a light source, wherein the light transmissive medium defines a first portion connected to a second portion via a first bend portion of about 90°, and a series of prisms formed in the light transmissive medium, each prism having a V-shaped groove with an incline angle of about 45°, wherein each prism has a depth and a length that increases from the first portion to the second portion, and wherein a separation gap between adjacent prisms decreases from the first portion to the second portion. The light pipe may have third and fourth portions and form a U-shape.

20 Claims, 4 Drawing Sheets

LIGHT PIPE

FIELD OF THE DISCLOSURE

The present disclosure generally relates to lighting devices, and more particularly relates to a cost affordable light pipe having a bend portion and designed to provide substantially uniform light distribution.

BACKGROUND OF THE DISCLOSURE

Automotive vehicles are commonly equipped with ambient lighting throughout the cabin interior. Ambient light may be emitted using light pipes that distribute the light output from a light source. It is desirable to provide for a cost-effective light pipe having a bend portion that distributes light uniformly throughout a length of the light pipe.

SUMMARY OF THE DISCLOSURE

According to a first aspect of the present disclosure, a light pipe is provided. The light pipe includes a light transmissive medium having an input at one end configured to be operatively coupled to a light source, wherein the light transmissive medium defines a first portion connected to a second portion via a first bend portion of greater than 45°, and a series of prisms formed in the light transmissive medium, each prism having a V-shaped groove formed in a surface of the light transmissive medium with an incline angle in the range of 30° to 60°, wherein each prism has a depth and a length that increases along a length of the light pipe from the first portion to the second portion and wherein a separation gap between adjacent prisms decreases along the length of the light pipe from the first portion to the second portion.

Embodiments of the first aspect of the disclosure can include any one or a combination of the following features:
- the first bend portion is approximately 90°;
- the first portion, the first bend portion and the second portion form an L-shape configuration;
- the light transmissive medium further comprises a third portion configured to be operatively coupled to a light source and a fourth portion coupled to the third portion via a second bend portion, wherein the third portion, the second bend portion and the fourth portion comprise a series of prisms and the light pipe has a U-shape;
- the light pipe is configured to be installed on a vehicle;
- the light pipe is configured to be installed on a center console on the vehicle;
- the series of prisms have a periodic cycle that is the sum of the length and the separation gap, wherein the periodic cycle remains the same throughout the first bend portion;
- the first portion is substantially straight and the second portion is substantially straight;
- the incline angle of each prism is approximately 45°;
- the light transmissive medium has an index of refraction in the range of about 1.4-1.7;
- the light transmissive medium comprises at least one of PMMA and polycarbonate; and
- a light blocking cover covering a surface of the light pipe to block light from exiting the surface.

According to a second aspect of the present disclosure, a U-shaped light pipe is provided. The U-shaped light pipe includes a light transmissive medium having a first input at a first end and configured to be operatively coupled to a first light source and a second input at a second end configured to be operatively coupled to a second light source, wherein the light transmissive medium defines a substantially straight first portion connected to a substantially straight second portion via a first bend portion of about 90° and a straight third portion connected to a straight fourth portion via a second bend portion of about 90°, and a series of prisms formed in the light transmissive medium, each prism having a V-shaped groove formed in a surface of the light transmissive medium with an incline angle in the range of 30° to 60°, wherein each prism has a depth and a length that increases along a length of the light pipe from the first portion to the second portion and from the third portion to the fourth portion, and wherein a separation gap between adjacent prisms decreases along the length of the light pipe from the first portion to the second portion and from the third portion to the fourth portion.

Embodiments of the second aspect of the disclosure can include any one or a combination of the following features:
- the light pipe is configured to be installed on a vehicle;
- the light pipe is configured to be installed on a center console on the vehicle;
- the series of prisms have a periodic cycle that is the sum of the length and gap, wherein the periodic cycle remains the same throughout the first bend portion and the second bend portion;
- the light transmissive medium comprises at least one of PMMA and polycarbonate; and
- the incline angle of each prism is approximately 45°.

According to a third aspect of the present disclosure, a U-shaped lighting device is provided. The U-shaped lighting device includes a light pipe comprising a light transmissive medium having a first input at a first end and a second input at a second end, wherein the light transmissive medium defines a substantially straight first portion connected to a substantially straight second portion via a first bend portion of about 90° and a substantially straight third portion connected to a substantially straight fourth portion via a second bend portion of about 90, and a series of prisms formed in the light transmissive medium, each prism having a V-shaped groove formed in a surface of the light transmissive medium with an incline angle in the range of 30° to 60°, wherein each prism has a depth and a length that increases along a length of the light pipe from the first portion to the second portion and from the third portion to the fourth portion, and wherein a separation gap between adjacent prisms decreases along the length of the light pipe from the first portion to the second portion and from the third portion to the fourth portion. The U-shaped lighting device also includes a translucent lens operatively coupled to the light pipe, a first light source operatively coupled to the first input, and a second light source operatively coupled to the second input.

An embodiment of the third aspect of the disclosure can include any one or a combination of the following feature:
- the lighting device is configured to be installed on a vehicle center console.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
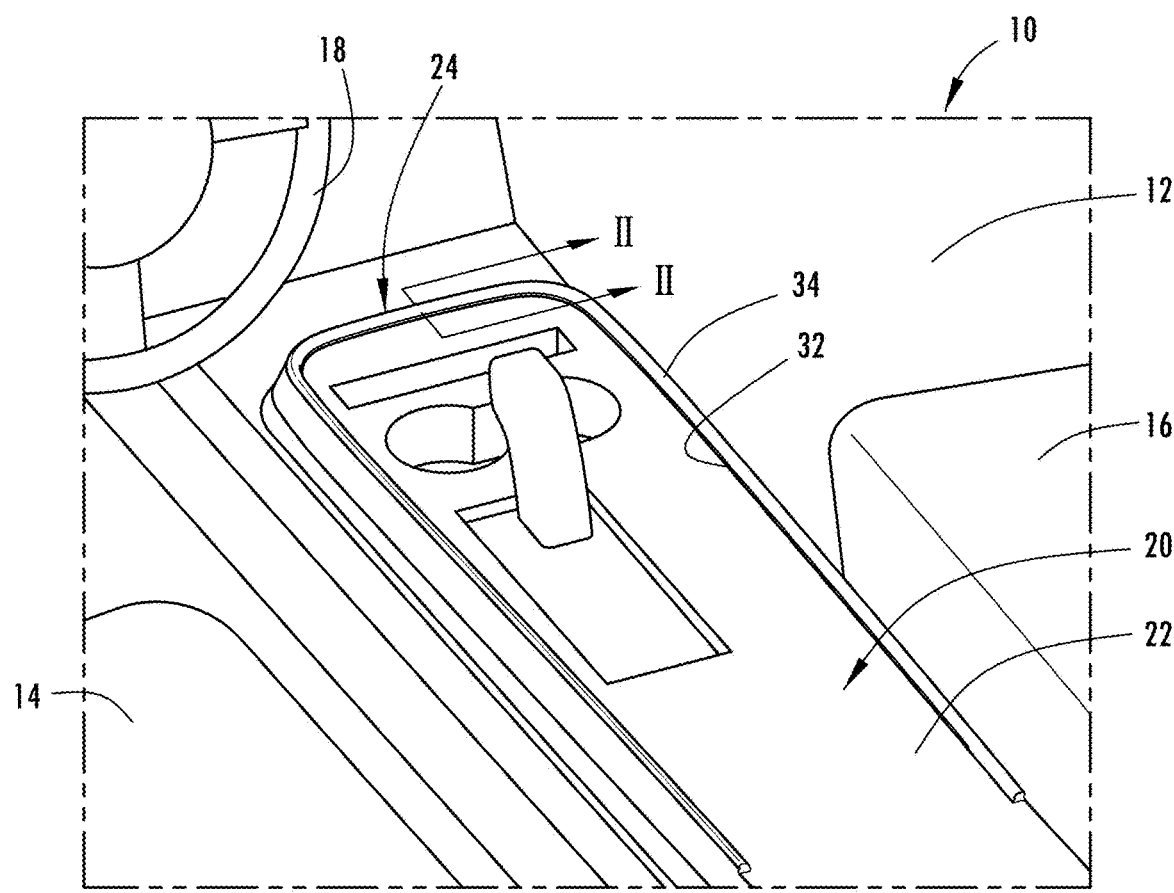
FIG. 1 is a rear perspective view of a portion of a cabin interior of a vehicle having a center console equipped with a lighting device having a light pipe, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a lighting device and a light pipe for distributing and emitting light. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, the cabin interior 12 of an automotive or motor vehicle 10 is generally illustrated configured with seating and accommodations for transporting occupants. The cabin interior 12 is generally defined by a vehicle body and may contain various features and trim components within the vehicle body. The cabin interior 12 is shown having an arrangement of passenger seats arranged as front row seating including a driver seat 14 and passenger seat 16. The cabin interior 12 may include additional seating, such as a second row of seating and additional rows of seating.

The driver seat 14 is shown located rearward of a steering wheel 18 for the driver to manipulate to steer steerable road wheels of the vehicle 10 when operated in a manually operated mode. The passenger seat 16 is located on an opposite lateral side of the cabin interior 12 and is spaced apart from the driver seat 14. A center console 20 is shown located between the driver seat 14 and the passenger seat 16. The center console 20 may extend forward towards a front portion of the cabin interior 12, such as near a dashboard and may be supported on a floor of the vehicle 10. The center console 20 may include various accessories and trim features such as one or more drink holders, a transmission shifter, input switches, storage compartments, portable device holders, device chargers and charging ports and an armrest, for example.

The center console 20 is shown having an upper housing 22 generally in the shape of an approximate rectangle having curved surfaces at the forward two corners. The center console 20 further includes an ambient lighting device 24 that extends around a peripheral edge 36 at the perimeter along the upper left and right sides and the upper front side of the housing 22. The lighting device 24 extends along the upper lateral sides of the housing 22 and along the upper front side of the housing 22 in a generally U-shape configuration. The U-shaped lighting device 24 emits light to provide ambient lighting to illuminate the border surface above the housing 22.

Figure 2:
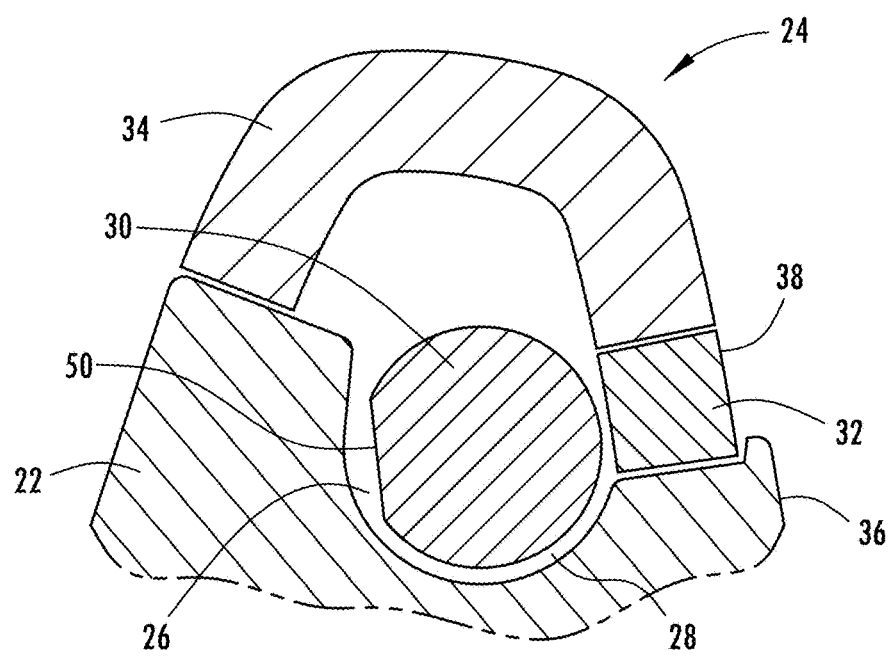
FIG. 2 is a cross-sectional view taken through lines II-II of FIG. 1 illustrating the lighting device.
Figure 3:
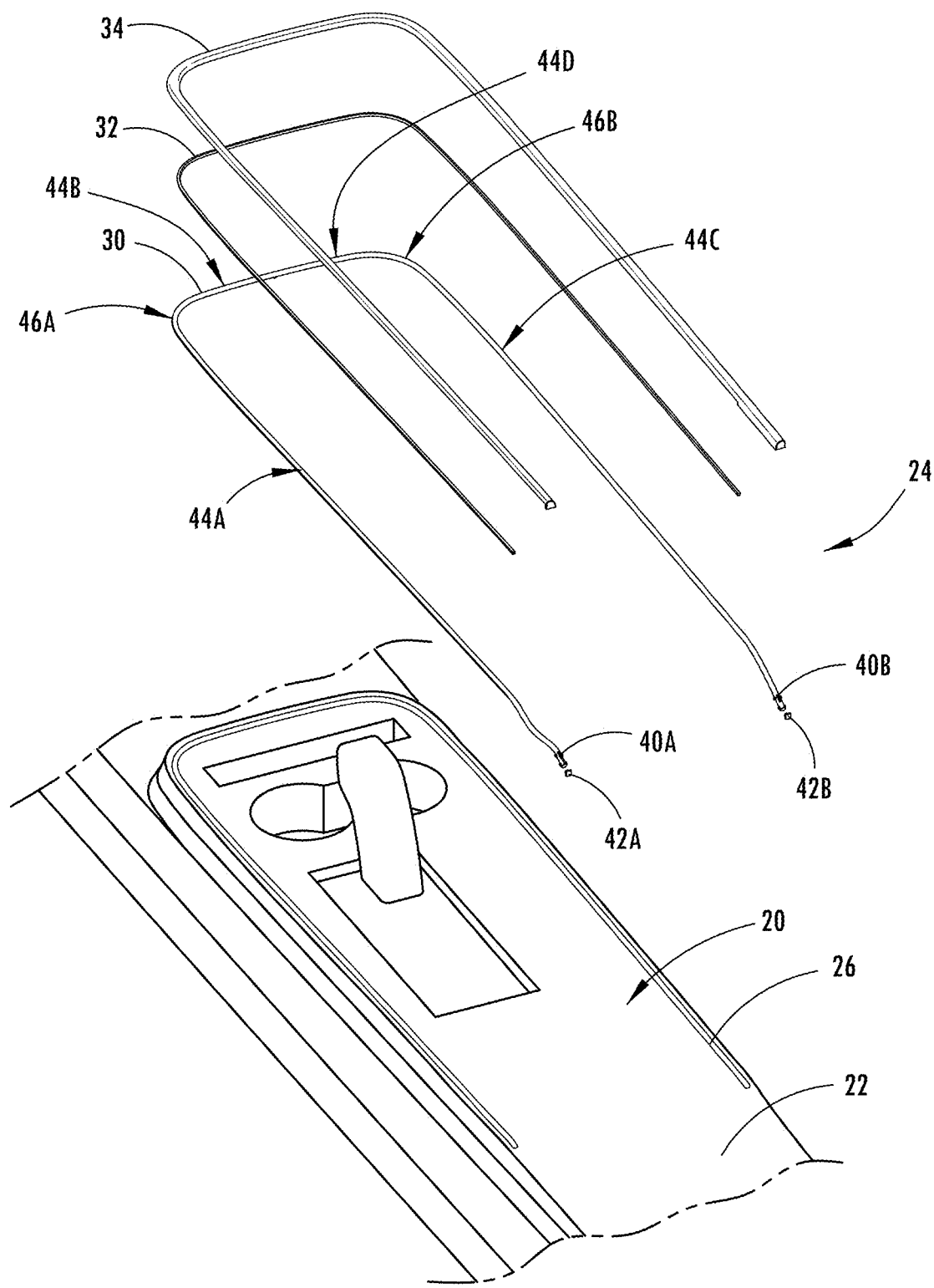
FIG. 3 is an exploded view of the center console and the lighting device illustrated in FIG. 1.

The lighting device 24 is further illustrated in FIGS. 2 and 3 located within a slot 26 along peripheral edge 36 defining the perimeter of the upper housing 22. As such, the lighting device 24 extends along or near the peripheral edge 36 of the upper housing 22. The lighting device 24 includes a U-shaped light pipe 30 that is shown having a generally U-shape configuration and disposed within the slot 26 of upper housing 22. The light pipe 30 has a first input 40A located at a first terminal end and a second input 40B located at a second terminal end. The light pipe 30 has a first substantially straight portion 44A that generally extends from the first input 40A to a first bend portion 46A that forms a first 90° corner. The light pipe 30 further includes a second substantially straight portion 44B that extends from the first bend portion 46A. As such, the first bend portion 46A interconnects the first substantially straight portion 44A and second substantially straight portion 44B. The bend portion 46A is bent at an angle greater than 45°, and more preferably is bent at an angle of approximately 90°.

The light pipe 30 also includes a third substantially straight portion 44C that generally extends from the second input 40B to a second bend portion 46B that forms a second 90° corner. The light pipe 30 further includes a fourth substantially straight portion 44D that extends from the second bent portion 46B. As such, the second bent portion 46B interconnects the third substantially straight portion 44C and the fourth substantially straight portion 44D. The second bent portion 46B is bent at an angle greater than 45°, and more particularly at an angle of approximately 90°.

The third substantially straight portion 44C and fourth substantially straight portion 44D are aligned and integrally joined together at the ends of each portion such that the light pipe 30 has a U-shape configuration. As a result, the first substantially straight portion 44A, first bend portion 46A, and second substantially straight portion 44B which forms an L-shape generally mirrors the third substantially straight portion 44C, the second bend portion 46B and the fourth substantially straight portion 44D which forms an L-shape.

The light pipe 30 is made of an injection molded light transmissive material that transmits light illumination from a pair of light sources and distributes the light and emits the light throughout at least a side wall portion of the light pipe 30 along the length of the light pipe. The length of the light pipe 30 is greater than 1,000 nm, more particularly greater than 1,500 nm and in one example is about 1,680 nm. A first light source 42A, such as a first light-emitting diode (LED), is operatively coupled to the first input 40A. A second light source 42B, such as a second light-emitting diode (LED), is operatively coupled to the second input 40B. As such, light emitted by each of the first and second light sources 42A and 42B is illuminated into the light pipe 30 at the first and second inputs 40A and 40B, respectively, and distributed throughout a length of the light pipe 30 and is emitted with substantially uniform light distribution. The first and second light sources 42A and 42B may each be configured as red-green-blue (RGB) LEDs that may emit light at a desired color which may include color mixing of the red, green and blue colored light.

The lighting device 24 also includes a translucent lens 32 positioned proximate to the light pipe 30. The light distributed within the light pipe 30 is emitted and directed at the translucent lens 32. The translucent lens 32 diffuses or scatters the light to provide ambient lighting. As such, the translucent lens 32 has an output side 38 that emits the light illuminated by the light pipe 30. In the example shown, the translucent lens 32 has a strip or bar shape that has a generally rectangular cross-section for emitting light along the strip, however, it should be appreciated that the translucent lens 32 may have other shapes and sizes. The lighting device 24 further has an opaque cover 34 shown covering an upper portion of the light pipe 30. The opaque cover 34 may conceal and protect the light pipe 30 and prevents light illumination from transmitting through the opaque cover 34 such that light leakage is not present other than the light illuminated through the translucent lens 32. The lighting device 24 may be connected to the center console 20 by use of one or more connectors such as snap-fit connectors or adhesive 28 which may be applied to any of the light pipe 30, the translucent lens 32, and the opaque cover 34 to hold and maintain the lighting device 24 in a fixed position on the center console 20.

The light pipe 30 is further illustrated in greater detail in FIGS. 4-9. The light pipe 30 is made of a light transmissive medium operatively configured to receive light and to distribute the light throughout the light pipe 30. The light pipe 30 has a length greater than 1,000 nm, greater than 1,500 nm and more particularly of about 1,680 nm and may be made of a light transmissive medium having a high index of refraction in the range of about 1.4 to 1.7, according to one embodiment. The light transmissive medium may include a transparent and rigid plastic such as polymethyl methacrylate (PMMA), which is a synthetic resin produced from the polymerization of methacrylate and has an index of refraction of about 1.49, according to one example. According to another example, the light tranmissive medium may include a thermoplastic polymeric, such as polycarbonate having an index or refraction of about 1.59. The light pipe 30 may be formed in a mold using injection molding.

Figure 4:
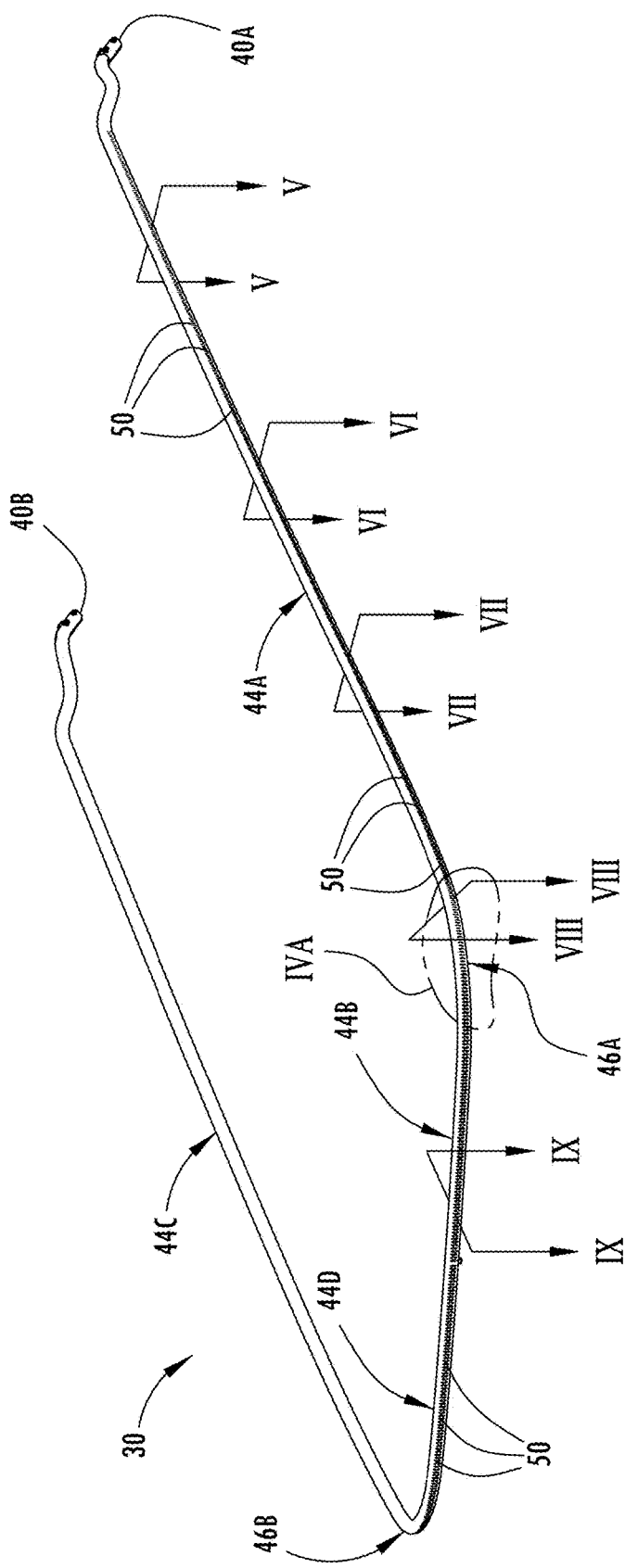
FIG. 4 is a front perspective view of the light pipe employed in the lighting device, according to one example.
Figure 4A:
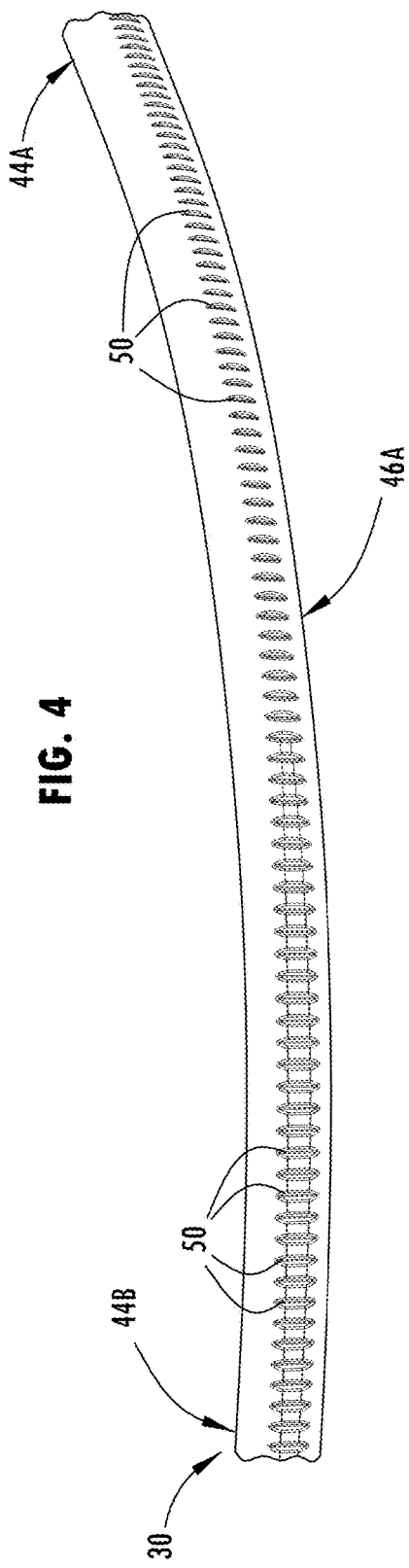
FIG. 4A is an enlarged view of section IVA taken from FIG. 4 further illustrating the light pipe at a bend portion between first and second substantially straight portions.

The light pipe 30 is formed to include a series of prisms 50 which generally extend in a periodic arrangement along the length of the U-shaped light pipe 30. The series of prisms 50 may be integrally formed in the light transmissive medium during the injection molding process. By forming a series of prisms 50 in the light pipe 30, light distributed within the light pipe 30 may be directed in a pattern such as a 35° cone for emission from the light pipe 30. Each prism 50 is formed as a V-shaped groove or depression in the surface of the light pipe 30 and has a cross-sectional saw tooth shape with an incline angle α in a range of about 30°-60°, and more particularly at an angle of about 45°. Each prism 50 is defined by a V-shaped groove having a depth D and a length Δ that increases along the length of the light pipe 30 from the first portion 44A to the second portion 44B and a separation gap G between adjacent prisms 50 that decreases along the length of the light pipe 30 from the first portion 44A to the second portion 44B. Similarly, the series of prisms 50 defined by V-shaped grooves increase in depth D and length Δ along the length of the light pipe 30 from the third portion 44C to the fourth portion 44D and the separation gap decreases along the light pipe 30 from the third portion 44C to the fourth portion 44D. As seen in FIGS. 4 and 4A, the series of prisms 50 increase in depth D and length Δ and the separation gap G decreases to reflect and refract the light to achieve a substantially uniform light emission as it proceeds from the first portion 44A to the second portion 44B throughout the first bend portion 46A. Similarly, the series of prisms 50 in the third and fourth portions 44C and 44D are likewise formed so that the depth D and length Δ through the second bend 46B increases while the separation gap G decreases to achieve substantially uniform light emission.

Figure 5:
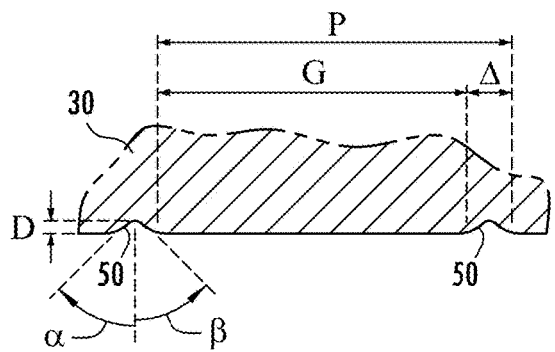
FIG. 5 is a cross-sectional view taken through line V-V of FIG. 4 illustrating the series of prisms at a first location of the light pipe.
Figure 6:
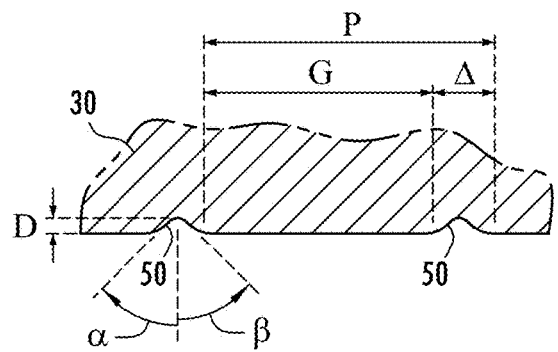
FIG. 6 is a cross-sectional view taken through line VI-VI of FIG. 4 illustrating the series of prisms at a second location of the light pipe.
Figure 7:
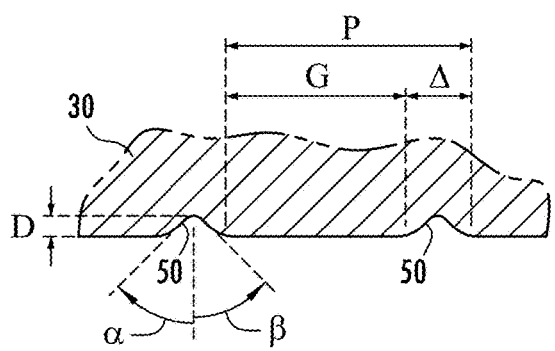
FIG. 7 is a cross-sectional view taken through line VII-VII of FIG. 4 illustrating the series of prisms at a third location of the light pipe.
Figure 8:
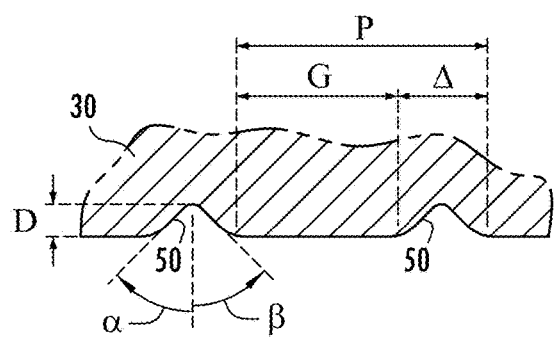
FIG. 8 is a cross-sectional view taken through line VIII-VIII of FIG. 4 illustrating the series of prisms at a fourth location of the light pipe.
Figure 9:
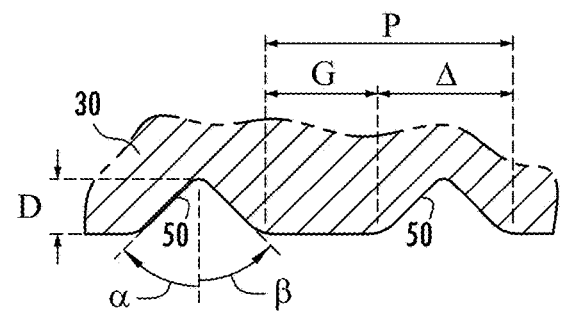
FIG. 9 is a cross-sectional view taken through line IX-IX of FIG. 4 illustrating the series of prisms at a fifth location of the light pipe.

The series of prisms 50 at various locations along the length of the light pipe 30 are illustrated in various cross-sections in FIGS. 5-9. The series of prisms 50 at a first location nearest to the input 40A are shown in FIG. 5 having a relatively small depth D, a relatively small length Δ and a relatively large separation gap G. At the second location shown in FIG. 6, the depth D and length Δ of the prisms 50 are increased and the separation gap G is decreased. Proceeding further along the first substantially straight portion 44A to the third location shown in FIG. 7, the series of prisms 50 have a depth D and length Δ that are further increased and a separation gap G that is decreased. Proceeding to the fourth location shown in FIG. 8 at the beginning of the first bend portion 46A, the depth D and length Δ are further increased and the separation gap G is further decreased. Finally, at a fifth location on the second straight portion 44B after the first bend portion 46A as seen in FIG. 9, the depth D and length Δ is shown further increased and the gap G is further decreased.

It should be appreciated that each of the series of prisms 50 has an incline angle α and decline angle β that define the V-shaped groove or saw tooth shape of each prism 50. Each angle α and β has an angle of approximately 45°. As such, each of the series of prisms 50 may reflect or refract light transmitted through the light pipe 30 within an output window along a length of the light pipe 30. The gap G and length Δ together define a pitch P which is the periodic cycle of the saw tooth pattern of the series of prisms 50. Each prism 50 has a height D and length Δ which increases along the length of the prism 50 and a separation gap G that decreases along the length of the prism 50. Each prism 50 may have a tip with a radii that is approximately 0.05 mm and each groove may have a radii of approximately 0.15 mm, according to one example.

The light pipe 30 may have a depth D and a length Δ that continuously increases from the first input 40A of the first portion 44A to the end of the second portion 44B and from the second input 40B of the third portion 44C to the end of the fourth portion 44D. Alternately, the depth D and length Δ may increase at predefined locations between each of the first and second inputs 40A and 40B and the ends of the second and fourth portions 44B and 44D. Similarly, the gap G may continuously decrease from the first input 40A of the first portion 44A to the output of the second portion 44B and from the second input 40B of the third portion 44C to the output of the fourth portion 44D. Alternately, the gap G may decreased at predefined locations along the length of the light pipe 30.

It should be appreciated that the first and second substantially straight portions 44A and 44B together with the first bend portion 46A define an L-shape light pipe 30 that is essentially symmetric or mirrored with the L-shaped light pipe defined by the third and fourth substantially straight portions 44C and 44D and second bend portion 46D. As such, the series of prisms 50 including the depth D and length L of the prisms 50 and the separation gap G between the prisms 50 changes along the length of each of the two L-shaped prisms to uniformly distribute the light.

The U-shaped light pipe 30 operates by receiving light at the first and second inputs 40A and 40B from the respective first and second light sources 42A and 42B. The light is transmit throughout each of the two L-shaped portions of the U-shaped light pipe 30 and is distributed throughout the length of the U-shaped light pipe 30 in a manner that is substantially uniform. As the light is illuminated through the first and second bend portions 46A and 46B, the light maintains a substantially uniform output emission, thereby preventing the presence of hot spots, particularly at the bend portions 46A and 46B. this is achieved by changing the length Δ and gap G throughout the bend portions 46A and 46B.

The light pipe 30 has a relatively long length and first and second bending portions which extract light to create uniformity by changing the height and gap of the prisms in the light pipe 30. To achieve a homogenous illumination, a smaller pitch or height of the prism may be maintained. For example, for a first portion of the light pipe at the input end, such as, for example, one-quarter of the light pipe, for each L-shaped portion the light pipe may have a pitch or height of approximately 1.5 mm and the remainder of the L-shaped portion light pipe may have a pitch or height of approximately 1.0 mm which allows for simplified manufacture. The U-shaped light pipe advantageously achieves a 2:1 luminance contrast ratio of maximum illumination to minimum illumination for the light pipe.

Accordingly, the light pipe 30 advantageously provides for uniform light distribution throughout a light pipe 30 having one or more bends. Specifically, the light pipe 30 provides for a substantially uniform distribution of light through a U-shaped light pipe. The light pipe 30 is cost affordable and offers uniform light distribution throughout the length of the light pipe and particularly throughout the bend portions in a lighting device 24, particularly for use in a vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A light pipe comprising:
 a light transmissive medium having an input at one end configured to be operatively coupled to a light source, wherein the light transmissive medium defines a first portion connected to a second portion via a first bend portion of greater than 45°; and a series of prisms formed in the light transmissive medium, each prism having a V-shaped groove formed in a surface of the light transmissive medium with an incline angle in the range of 30° to 60°, wherein each prism has a depth and a length that increases along a length of the light pipe from the first portion to the second portion and wherein a separation gap between adjacent prisms decreases along the length of the light pipe from the first portion to the second portion.

2. The light pipe of claim 1, wherein the first bend portion is approximately 90°.

3. The light pipe of claim 2, wherein the first portion, the first bend portion and the second portion form an L-shape configuration.

4. The light pipe of claim 1, wherein the light transmissive medium further comprises a third portion configured to be operatively coupled to a light source and a fourth portion coupled to the third portion via a second bend portion, wherein the third portion, the second bend portion and the fourth portion comprise a series of prisms and the light pipe has a U-shape.

5. The light pipe of claim 4, wherein the light pipe is configured to be installed on a vehicle.

6. The light pipe of claim 5, wherein the light pipe is configured to be installed on a center console on the vehicle.

7. The light pipe of claim 1, wherein the series of prisms have a periodic cycle that is the sum of the length and the separation gap, wherein the periodic cycle remains the same throughout the first bend portion.

8. The light pipe of claim 1, wherein the first portion is substantially straight and the second portion is substantially straight.

9. The light pipe of claim 1, wherein the incline angle of each prism is approximately 45°.

10. The light pipe of claim 1, wherein the light transmissive medium has an index of refraction in the range of about 1.4-1.7.

11. The light pipe of claim 1, wherein the light transmissive medium comprises at least one of PMMA and polycarbonate.

12. The light pipe of claim 1, further comprising a light blocking cover covering a surface of the light pipe to block light from exiting the surface.

13. A U-shaped light pipe comprising:
a light transmissive medium having a first input at a first end and configured to be operatively coupled to a first light source and a second input at a second end configured to be operatively coupled to a second light source, wherein the light transmissive medium defines a substantially straight first portion connected to a substantially straight second portion via a first bend portion of about 90° and a straight third portion connected to a straight fourth portion via a second bend portion of about 90°; and a series of prisms formed in the light transmissive medium, each prism having a V-shaped groove formed in a surface of the light transmissive medium with an incline angle in the range of 30° to 60°, wherein each prism has a depth and a length that increases along a length of the light pipe from the first portion to the second portion and from the third portion to the fourth portion, and wherein a separation gap between adjacent prisms decreases along the length of the light pipe from the first portion to the second portion and from the third portion to the fourth portion.

14. The U-shaped light pipe of claim 13, wherein the light pipe is configured to be installed on a vehicle.

15. The U-shaped light pipe of claim 13, wherein the light pipe is configured to be installed on a center console on the vehicle.

16. The U-shaped light pipe of claim 13, wherein the series of prisms have a periodic cycle that is the sum of the length and gap, wherein the periodic cycle remains the same throughout the first bend portion and the second bend portion.

17. The U-shaped light pipe of claim 13, wherein the light transmissive medium comprises at least one of PMMA and polycarbonate.

18. The U-shaped light pipe of claim 13, wherein the incline angle of each prism is approximately 45°.

19. A U-shaped lighting device comprising:
a light pipe comprising:
a light transmissive medium having a first input at a first end and a second input at a second end, wherein the light transmissive medium defines a substantially straight first portion connected to a substantially straight second portion via a first bend portion of about 90° and a substantially straight third portion connected to a substantially straight fourth portion via a second bend portion of about 90°; and
a series of prisms formed in the light transmissive medium, each prism having a V-shaped groove formed in a surface of the light transmissive medium with an incline angle in the range of 30° to 60°, wherein each prism has a depth and a length that increases along a length of the light pipe from the first portion to the second portion and from the third portion to the fourth portion, and wherein a separation gap between adjacent prisms decreases along the length of the light pipe from the first portion to the second portion and from the third portion to the fourth portion;
a translucent lens operatively coupled to the light pipe;
a first light source operatively coupled to the first input; and
a second light source operatively coupled to the second input.

20. The U-shaped lighting device of claim 19, wherein the lighting device is configured to be installed on a vehicle center console.

* * * * *